(12) United States Patent
Krisch

(10) Patent No.: US 8,687,199 B2
(45) Date of Patent: Apr. 1, 2014

(54) DEFLECTION MEASURING DEVICE ACCORDING TO THE INTERFEROMETER PRINCIPLE

(75) Inventor: Henrik Krisch, Krefeld (DE)

(73) Assignee: KROHNE Messtechnik GmbH, Duisburg (DE)

( * ) Notice: Subject to any disclaimer, the term of this patent is extended or adjusted under 35 U.S.C. 154(b) by 300 days.

(21) Appl. No.: 13/013,862

(22) Filed: Jan. 26, 2011

(65) Prior Publication Data

US 2012/0057169 A1 Mar. 8, 2012

(30) Foreign Application Priority Data

Sep. 7, 2010 (DE) .......................... 10 2010 044 583

(51) Int. Cl.
*G01B 9/02* (2006.01)

(52) U.S. Cl.
USPC ......................................................... 356/482

(58) Field of Classification Search
USPC .................................................. 356/477, 482
See application file for complete search history.

(56) References Cited

U.S. PATENT DOCUMENTS

| | | | | |
|---|---|---|---|---|
| 4,295,739 A | * | 10/1981 | Meltz et al. ................... | 374/161 |
| 4,443,698 A | * | 4/1984 | Schiffner .................. | 250/227.19 |
| 5,038,618 A | * | 8/1991 | Malvern ......................... | 73/800 |
| 5,420,688 A | | 5/1995 | Farah | |
| 5,457,758 A | * | 10/1995 | Snitzer ............................ | 385/30 |
| 5,459,801 A | * | 10/1995 | Snitzer ............................ | 385/30 |
| 5,574,807 A | * | 11/1996 | Snitzer ............................ | 385/24 |
| 6,008,898 A | | 12/1999 | Furstenau et al. | |
| 7,324,714 B1 | * | 1/2008 | Cranch et al. ................... | 385/12 |
| 2004/0101249 A1 | * | 5/2004 | Tseng et al. .................... | 385/50 |

FOREIGN PATENT DOCUMENTS

| | | |
|---|---|---|
| CA | 2 549 810 A1 | 12/2007 |
| EP | 0 456 681 B1 | 11/1991 |
| EP | 1 936 332 A1 | 6/2008 |

OTHER PUBLICATIONS

W.N. MacPherson et al., Remotely Addressed Optical Fibre Curvature Sensor Using Multicore Photonic Crystal Fibre, Optics Communications, BD. 193, NR. 1-6, Jun. 15, 2001, pp. 97-104, XP004245384, ISSN: 0030-4018, DOI: 10.106/S0030-4018(01)01260-3.

Joel Villatoro et al., Temperature-Insensitive Photonic Crystal Fiber Interferometer for Absolute Strain Sensing, Applied Physics Letters, BD. 91, Aug. 27, 2007, pp. 91009-1, XP002462607, ISSN: 0003-6951, DOI: 10.1063/1.2775326.

* cited by examiner

*Primary Examiner* — Tari Fur Chowdhury
*Assistant Examiner* — Jonathon Cook
(74) *Attorney, Agent, or Firm* — Roberts Mlotkowski Safran & Cole, P.C.; David S. Safran

(57) ABSTRACT

An interferometer type deflection measuring device having a radiation source, a first fiber-optic means forming a first light path, a second fiber-optic means forming a second light path, a deflection body and an evaluation circuit, the first and second fiber-optic means receiving radiation from the radiation source on an input side, and radiation guided in the first and second fiber-optic means, respectively, being brought together on an output side with interference radiation being conveyed to the evaluation circuit for evaluation. The first fiber-optic means and the second fiber-optic means are arranged only on the deflection body, at least one of the first and second fiber-optic means being connected on the input side to the beam source with a single feed optical fiber and at least one of the first and second fiber-optic means being connected on the output side to the evaluation circuit by a single evaluation optical fiber.

2 Claims, 4 Drawing Sheets

DEFLECTION MEASURING DEVICE ACCORDING TO THE INTERFEROMETER PRINCIPLE

BACKGROUND OF THE INVENTION

1. Field of the Invention

The invention relates to a deflection measuring device according to the interferometer principle having a radiation source, a first fiber-optic means implementing a first light path, a second fiber-optic means implementing a second light path, a deflection body and an evaluation circuit, wherein the first fiber-optic means and the second fiber-optic means can be impinged with interference-capable radiation from the radiation source on the input side, wherein at least the first fiber-optic means is connected with the deflection body and wherein the first partial radiation guided in the first fiber-optic means and the second partial radiation guided in the second fiber-optic means are brought together on the output side and the interference radiation is conveyed to the evaluation circuit and evaluated by the evaluation circuit.

2. Description of Related Art

Deflection measuring devices using the interferometer principle have been known for quite some time in the prior art and are used everywhere where mechanical deflection of a deflection body have to be received and acknowledged with great sensitivity. Applications can be found, for example, in the field of vibration measuring devices that are based on repeating or also periodic deflection of a deflection body, wherein the deflection of the deflection body is either heteronomous by a physical process—e.g., in vortex flow measurement—or wherein a deflection of the deflection body is stimulated and the actual value of interest consists in the damping of the stimulated oscillation—e.g., in viscosity measurement. In other measuring tasks, the degree of deflection of the deflection body is of interest, such as, for example, in the metrologic detection of the deflection of a membrane in pressure or differential pressure measurement.

Fiber-optic interferometry is thus, inter alia, of advantage because very small deflections can already be detected, namely deflections that lie in the (sub-) wave range of the used radiation. As is known, two sufficiently temporal coherent—i.e., capable of interference—beams are brought to overlap by an interferometer. Normally, the radiation of the—coherent—radiation source is split with a first beam splitter and a second beam splitter, wherein the partial beams, in the case of the application seen here, are guided from fiber-optic means via these fiber-optic means. The light paths of the first partial beam and the second partial beam implemented by the fiber-optic means are also called the arms of the interferometer. At the exit of the interferometer, the partial beams are brought together and brought to interference. The radiation intensity at the exit of the interferometer is proportional to the cosine of the phase difference between both interfering partial beams. Changes in the phase difference, e.g., caused by the smallest changes of the length of an interferometer arm, result in a detectable change in intensity at the exit of the interferometer, wherein the change in length in the present case is based upon in that one of the light paths is guided over the deflection body so that a deflection of the deflection body immediately takes effect on the length of the light path and is, thus, detectable. The term "fiber-optic means" is not to be understood here in a restrictive sense of waveguides, however, it could be a waveguide. For example, different cores within a light waveguide can be meant by a fiber-optic means.

Mach Zender interferometers are often used as the interferometer, but other types of interferometers also come into question, for example, the Michelson interferometer. In order to create the radiation used in the interferometer, semiconductor lasers are particularly suitable as a radiation source. Even when light paths are being discussed here, which are implemented with the fiber-optic means, visible electromagnetic radiation should not be understood in a restrictive manner, but can mean any electromagnetic radiation as long as it is suitable for fiber-optic applications in the field of interferometry.

The high sensitivity of the interferometric measuring method, however, does not only have advantages, but also disadvantages, which, due to high sensitivity, always has the risk that undesired disturbance signals are created, which often occurs in the rough surroundings of process measurement. Here, the problem is that the deflection body with the first or second fiber-optic means attached on it has to be arranged close to the detecting process, whereas the evaluation circuit should be arranged as far as possible from the process, such as in high temperature or high pressure applications. In addition to the evaluation circuit, the optical couplers used are also often sensitive in terms of thermal and mechanical stress, wherein the optical couplers form the interaction sites of the first and the second fiber-optic means. When the optical coupler has to be arranged far away from the physical process to be detected by measurement, it is necessary that a very large extension of the light path formed by the first fiber-optic means and by the second fiber-optic means occurs. However, this also means that the area sensitive to deflection is not only limited to the deflection body, but also to a possibly wide-stretched supply area of the deflection body, which can be a problem for the reasons described above.

SUMMARY OF THE INVENTION

Thus, it is a primary object of the present invention to provide a deflection measuring device according to the interferometric principle using fiber-optic means which is less susceptible to disturbances occurring between the evaluation unit and the deflection body.

The above object is achieved in a deflection measuring device according to the interferometric principle, on which the invention is based, in that the first fiber-optic means and the second fiber-optic means are arranged only on the deflection body, the first fiber-optic means and/or the second fiber-optic means is/are connected on the input side to the radiation source with a single optical feed fiber and the first fiber-optic means and/or the second fiber-optic means is/are connected on the output side to the evaluation circuit with a single optical evaluation fiber. When it is said that the first fiber-optic means and the second fiber-optic means are arranged only on the deflection body, then this means that the fiber-optic means implementing the first and the second light paths extend only in the area of the deflection body and do not extend beyond the deflection body and also do not form a direct connection to the radiation source and to the evaluation circuit. Moreover, the connection of the first fiber-optic means and/or the second fiber-optic means with the radiation source is implemented via a single optical feed fiber, wherein, here, an intermediate optical coupler is not used, but rather connections between the optical fibers—between the feed fiber and the first and/or second fiber-optic means—are made using a known method, for example, using thermal splicing. This construction is based on the knowledge that a technically valuable interference effect can be implemented between the partial radiation of the first fiber-optic means and the second fiber-optic means, also without the normal construction with discrete optical couplers.

According to a preferred design of the invention, it is provided that the first fiber-optic means and the second fiber-optic means are formed together by an—one sole—optical multi-core, i.e., implemented by a plurality of optical cores within one optical fiber. The light paths of the first and second fiber-optic means are implemented in the one optical multi-core fiber each as a bundle of light-directing cores, which, for example, are all surrounded by a low-refractive material (cladding). Preferably, the first fiber-optic means and the second fiber-optic means are implemented by an optical dual-core fiber, wherein each light path is formed by a core of the dual-core fiber.

In a preferred design of the invention, the multi-core or dual-core fiber is implemented with a light-directing core and a light-directing ring area concentrically surrounding one of the cores, wherein this symmetrical construction has the advantage that there is no preferred direction, which simplifies the mounting of the concentric fiber.

In preferred designs, the first fiber-optic means and/or the second fiber-optic means are formed in the multi-core as well as the dual-core alternative as micro-structured optical fibers. Implementations in the form of photonic crystal fibers as solid core fibers (solid core PCF) as well as holey core fibers (holey core PCF) are also taken into account.

An advantageous design of the invention comprises the optical feed fiber and the evaluation optical fiber being formed by an optical single-core fiber, wherein it is possible, of course, to form only the optical feed fiber and only the evaluation optical fiber by an optical single-core fiber. Practically any distance between the radiation source and the evaluation circuit, on the one hand, and the light paths decisive for the interferometric measurement, on the other hand, can be bridged since the single-core fibers are not sensitive to any mechanical influences. In this area, between the first and the second fiber-optic means and the radiation source or evaluation circuit, practically no disturbances can be brought into the measurement procedure.

A particularly preferred design of the invention is wherein the first fiber-optic means and the second fiber-optic means are guided so close to one another that crosstalk of the partial radiation guided along each one of the fiber-optic means is possible to the other fiber-optic means. This measure makes it possible in a particularly simple manner to impinge the first fiber-optic means as well as the second fiber optic means with radiation from the radiation source, since it is sufficient to impinge just one of the two fiber-optic means with the radiation. Furthermore, this arrangement has the advantage that also an interaction in the form of interference between partial radiation guided in the first fiber-optic means and the second fiber-optic means is possible without a classic combination of the partial radiations being necessary.

So that a technically sufficient evaluable signals are created, the distance between the first fiber-optic means and the second fiber-optic means is chosen to be less than 10 wavelengths of the guided partial radiation, preferably the distance is chosen to be less than 5 wavelengths of the guided partial radiation, since, as experience has shown, then a sufficiently strong crosstalk of the partial radiations is implemented. In particular, crosstalk of the partial beams occurs between the first fiber-optic means and the second fiber-optic means by evanescent parts of the partial radiation guided outside of the first fiber-optic means and/or outside of the second fiber-optic means. These parts of the radiation move loss-free outside of the fiber-optic core within the low-refractive zone around the fiber core and can crosstalk in the neighboring core during the described sufficient approach of both fiber-optic means— here, the fiber-optic cores—and then be guided there.

It has been proven to be of no particular problem for coupling radiation into and decoupling radiation out of the second fiber-optic means, if the optical feed fiber has such a large light-guiding cross section that the feed fiber at the input-side junction at least partially covers the light-guiding cross section of the first fiber-optic means and the light-guiding cross section of the second fiber-optic means, so that practically both fiber-optic means can be impinged with radiation from the radiation source. It is correspondingly advantageous, if the evaluation optical fiber has such a large light-guiding cross section that the evaluation fiber at the output-side junction at least partially covers the light-guiding cross section of the first fiber-optic means and the light-guiding cross section of the second fiber-optic means. Multi-mode fibers are particularly suitable for the feeding fiber and the evaluation fiber in the described application, which usually have a light-directing core greater cross section than is the case in single-mode fibers.

In an alternatively preferred variation of the deflection measuring device according to the invention, it is provided that the light-guiding cross section of the optical feed fiber at the input-side junction at least partially covers only the light-guiding cross section of the first fiber-optic means or the light-directing cross section of the second fiber-optic means so that in this design, a direct feed is possible only into the first fiber-optic means or alternatively into the second fiber-optic means, which requires that the first fiber-optic means and the second fiber-optic means run sufficiently close to one another, as is already explained above. Accordingly, it can also be additionally or alternatively provided that the light-guiding cross section of the evaluation optical fiber at the output-side junction only partially covers the light-guiding cross section of the first fiber-optic means or the light-guiding cross section of the second fiber-optic means, whereby only the direct decoupling out of one of the fiber-optic means forming the optical paths is guaranteed. This also requires that it is possible for the first partial radiation in the first fiber-optic means and the second partial radiation in the second fiber-optic means to interact interferometrically due to a sufficient approach of both fiber-optic means. In these design examples, it is possible to use simply one single-core fiber in a common construction and with common core diameters for coupling of radiation and decoupling of radiation. The described measures of the common coupling or decoupling of radiation into one of the first and the second fiber-optic means or the coupling of radiation into only one of the two fiber-optic means and the decoupling of partial radiation out of only one of the fiber-optic means can be combined in different manners.

In detail, there are a number of possibilities for designing and further developing the deflection measuring device according to the invention. Here, please refer to the following description of embodiments in conjunction with the accompanying drawings.

DETAILED DESCRIPTION OF THE INVENTION

Figure 1:
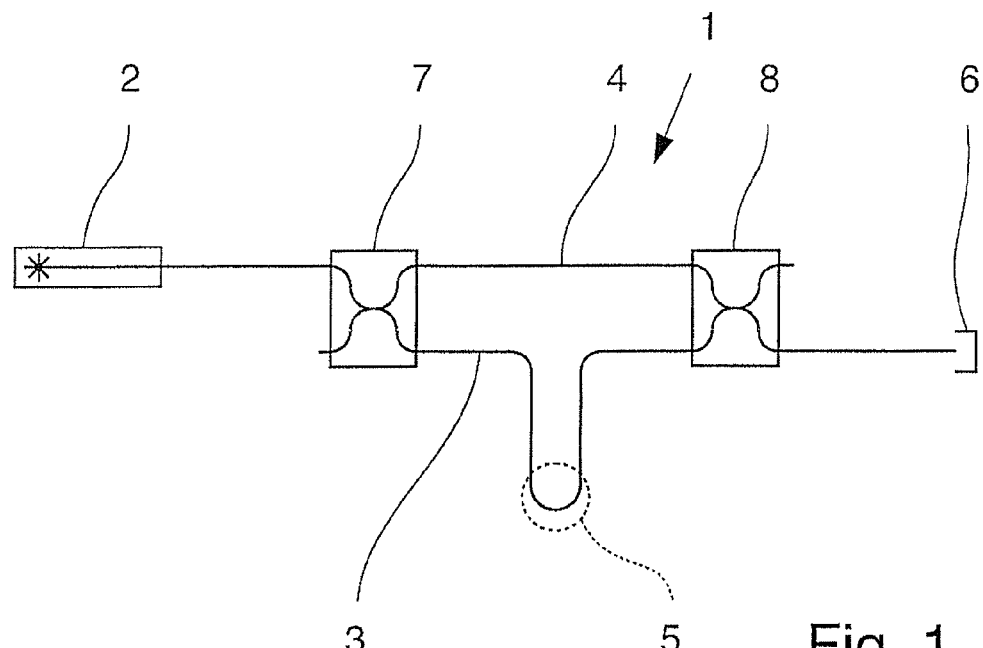
FIG. 1 schematically represents an implementation of a deflection measuring device based on the interferometer principle known from the prior art using a pressure-measuring device as an example.

A deflection measuring device known from the prior art, which functions according to the interferometer principal and is presently used for differential pressure measurement in a vortex flowmeter is shown in FIG. 1. The deflection measuring device 1 has a radiation source 2, a first fiber-optic means 3 implementing a first light path and a second fiber-optic means 4 implementing a second light path. The deflection body 5 is a flat membrane in the present case, which is surrounded by a medium that flows through a flowmeter (not shown).

The first fiber-optic means 3 and the second fiber-optic means 4 are impinged on the input side with interference-capable radiation from the radiation source 2, wherein, in the present case, the first fiber-optic means 3 is joined with the deflection body 5 designed as a membrane, normally, by optical couplers 7, 8, which initially transmit radiation present only in the second fiber-optic means 4 also to the first fiber-optic means 3, so that it is ensured that the first partial radiation and the second partial radiation from the first fiber-optic means 3 and the second fiber-optic means 4, which are brought together again in the second optical coupler 8, are able to interfere.

Depending on the degree of deflection of the deflection body 5 designed as a membrane and the change in length of the first light path in the first fiber-optic means 3 caused thereby, the interference radiation is adjusted to the evaluation circuit 6 as a result, which allows conclusions to be made about the deflection of the deflection body 5. In high-temperature applications, the deflection body 5 designed as a membrane is readily subject to temperatures of more than 100° C., so that in the real technical implementation of the optical couplers 7, 8, the radiation source 2 and the evaluation circuit 6 are purposely set at a distance from the actual measuring site—namely the deflection body 5. This, however, is disadvantageous in that the mechanically sensitive path between both optical couplers 7, 8 is not only formed in the area of the deflection body 5, but also on a substantially longer path, at which the danger of interspersion of disturbances exists, which, for example, are caused by vibrations in the deflection measuring device.

Figure 2:
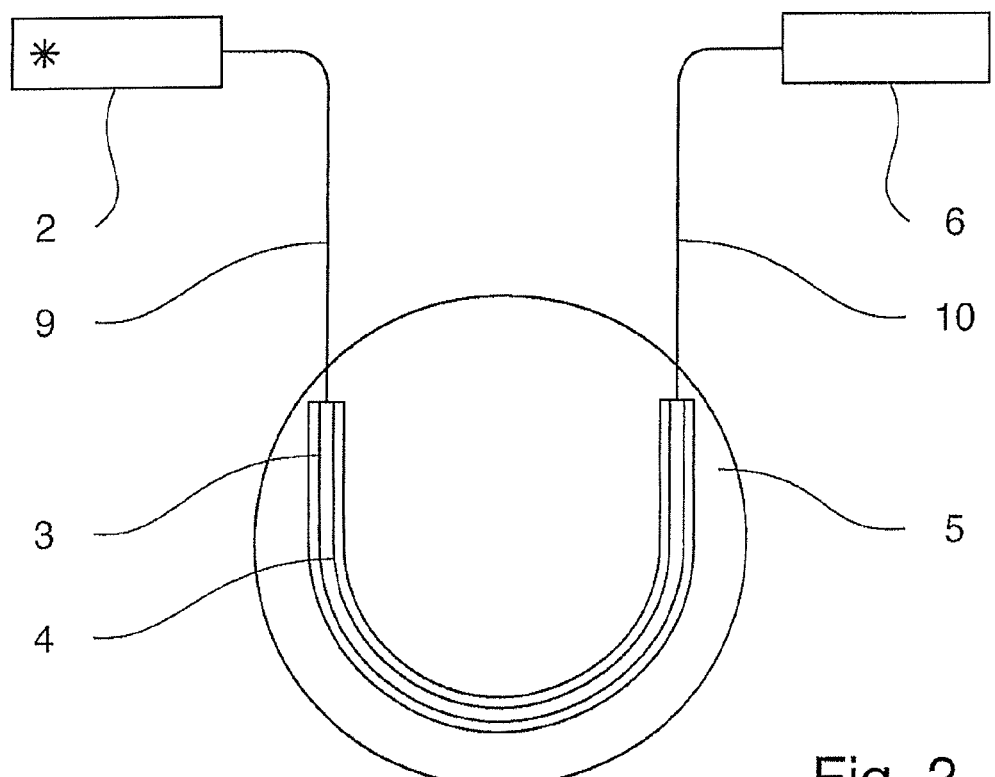
FIG. 2 is a cross-sectional view of a deflection measuring device according to the invention.

The construction of a deflection measuring device according to the invention is schematically indicated in FIG. 2, in which the mechanical disturbances of the actual measurement of interest of the deflection of the deflection body cannot occur so simply. Here, the first fiber-optic means 3 and the second fiber-optic means 4 are arranged only on the deflection body 5, namely joined to the deflection body 5 in such a manner that the deflection of the deflection body 5 automatically results in a change in the light path defined by the first fiber-optic means 3 and the second fiber-optic means 4, and thus, at an evaluable interference occurrence, which is detected by the evaluation circuit 6.

In the present case, the first fiber-optic means 3 is joined on the input side to the radiation source 2 with one single optical feed fiber 9 and the first fiber-optic means 3 is also joined on the output side to the evaluation circuit 6 with a single evaluation optical fiber 10. The light paths defined by the optical feed fiber 9 and the evaluation optical fiber 10 are practically disturbance-free, since interferences cannot occur here. The arrangement shown is thus advantageous because the discrete use of fiber-optic couplers—as they were used in the embodiment according to FIG. 1—is completely eliminated here. An optical connection between the feed fiber 9 and the first fiber-optic means 3 and the evaluation fiber 10 and the first fiber-optic means 3 is implemented here by common splice techniques.

Figure 3:
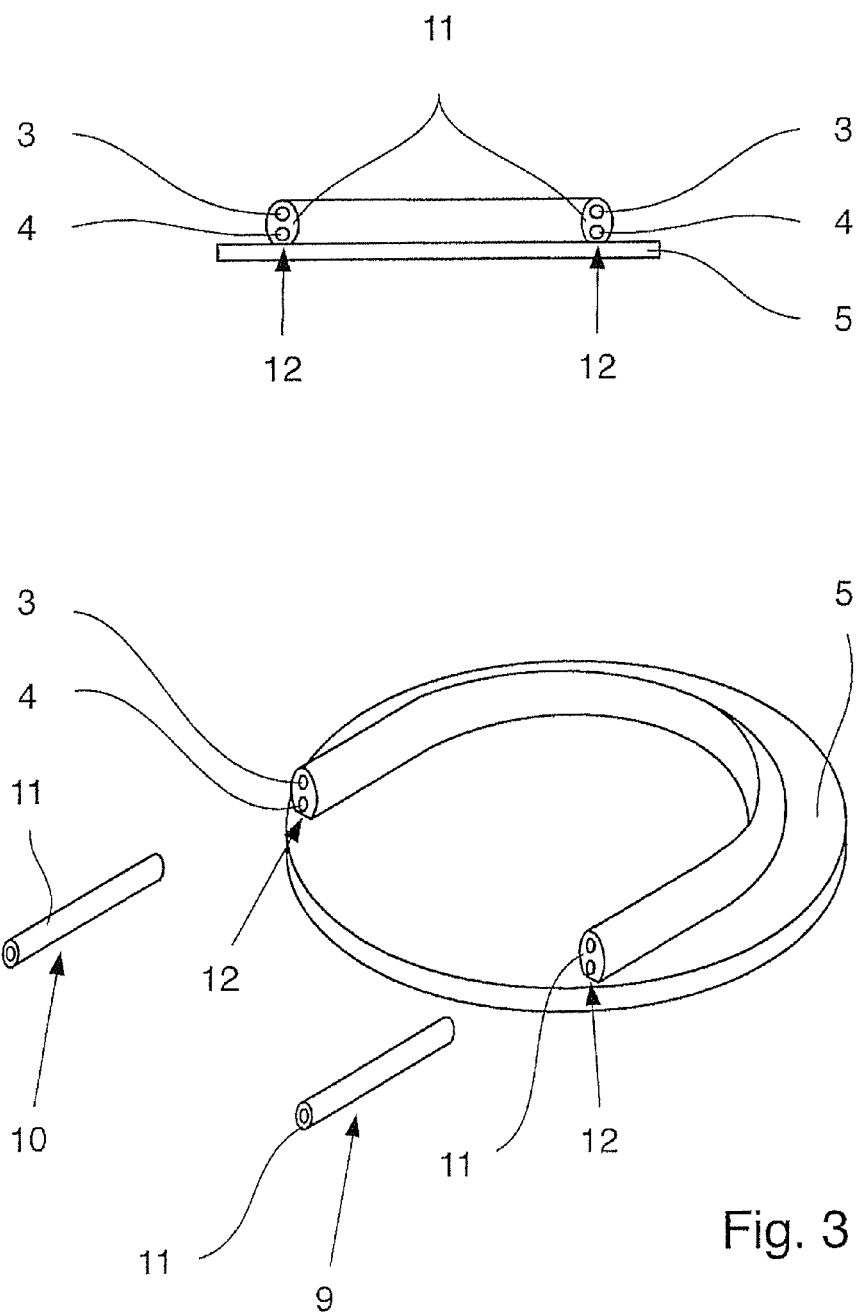
FIG. 3 is a schematic perspective view of the fiber arrangement on a membrane according to the embodiment shown in FIG. 2.

As can be seen in FIG. 3, the first fiber-optic means 3 and the second fiber-optic means 4 are implemented together by an optical dual-core fiber, i.e., by a fiber in which two optical cores are embedded in a low-refraction sleeve 11. It can also be seen in FIG. 3 that the optical feed fiber 9 and the evaluation optical fiber 10 are each formed by an optical single-core fiber, which also has an optically-conductive core and a low-refraction sleeve 11.

In all of the illustrated embodiments, the first fiber-optic means 3 and the second fiber-optic means 4 are so close to one another that crosstalk of the partial radiation guided in each of the fiber-optic means 3, 4 is possible to the other fiber-optic means 4, 3, wherein presently the distance between the first fiber-optic means 3 and the second fiber-optic means 4 is less than 5 wavelengths of the guided partial radiation. For this reason, it is guaranteed in the shown embodiments that crosstalk of the partial radiation between the first fiber-optic means 3 and the second fiber-optic means 4 occurs by evanescent parts of the partial radiation guided outside of the first fiber-optic means 3 and outside of the second fiber-optic means 4.

It can be seen in FIG. 3 that the dual-core fiber, which forms the first fiber-optic means 3 and the second fiber-optic means 4, has a flattening 12 which lies flat against the deflection body 5, wherein it has been taken into account that the flattening 12 has a fixed orientation relative to the cores of the dual-core fiber; in the present case, namely, the cores are arranged, in particular, one above the other perpendicular to the flattening 12. This arrangement guarantees that the first fiber-optic means 3 and the second fiber-optic means 4 do not experience exactly the same deflection, i.e., the light paths are shortened or lengthened differently during deflection of the deflection body 5 so that a resulting interference effect can be perceived.

In FIGS. 4 to 7, different designs of the transition between the optical feed fiber 9 and the first fiber-optic means 3 and the second fiber-optic means 4 or the design between the first fiber-optic means 3 and the second fiber-optic means 4 and the evaluation fiber 10 are shown very schematically.

Figure 4:
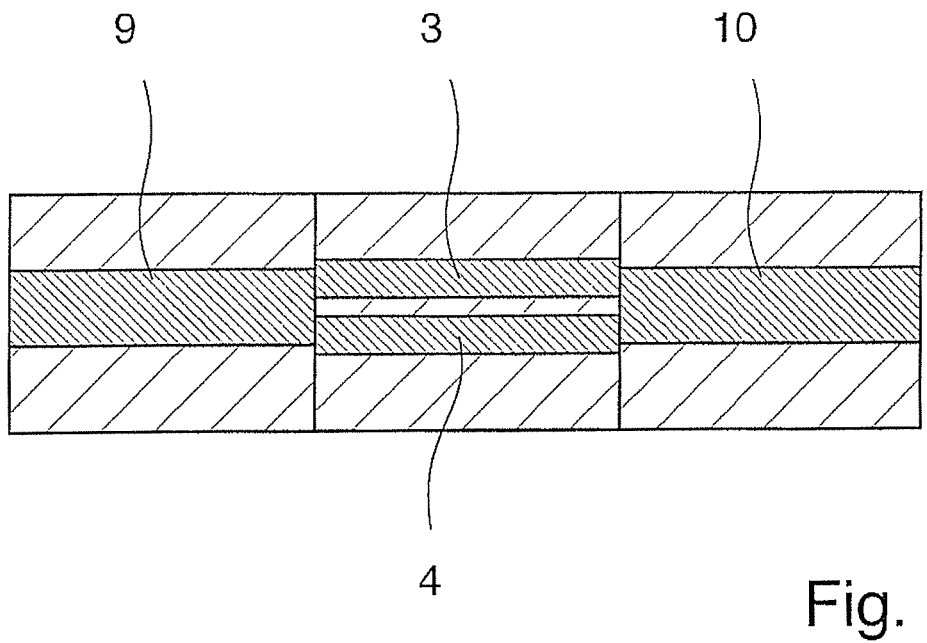
FIG. 4 is a schematic representation of a splice site between a first and a second fiber-optic means and an evaluation fiber.

It is indicated in FIG. 4 that the optical feed fiber 9 has such a large light-guiding cross section that the feed fiber 9 at least partially covers both the light-guiding cross section of the first fiber-optic means 3 and the light-guiding cross section of the second fiber-optic means 4 at the input side junction, and the same being true for the evaluation optical fiber 10, which has such a large light-guiding cross section that it at least partially covers both the light-guiding cross section of the first fiber-optic means 3 and the light-guiding cross section of the second fiber-optic means 4 at the output side junction.

Figure 5:
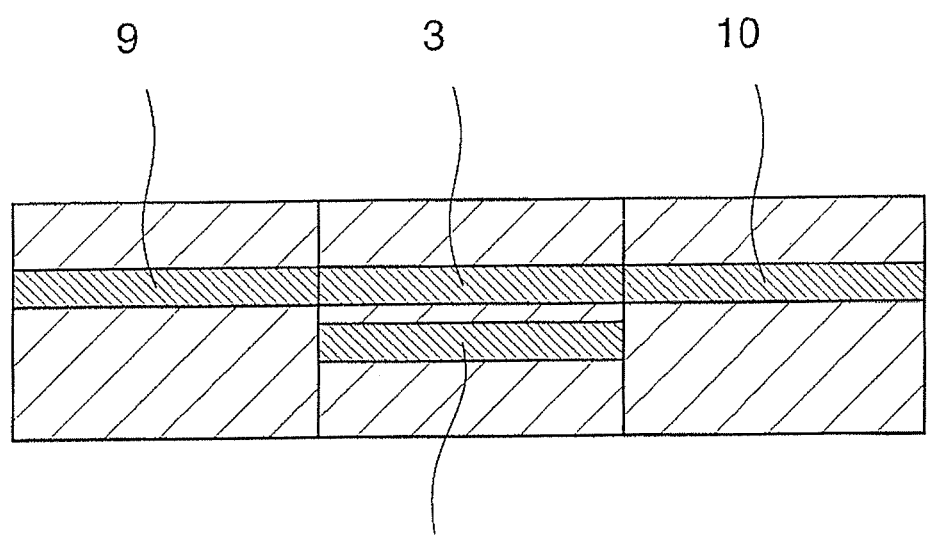
FIG. 5 is a schematic representation of the transition between the feed fiber, the first and the second fiber-optic means and the evaluation fiber of a deflection measuring device according to the invention.
Figure 6:
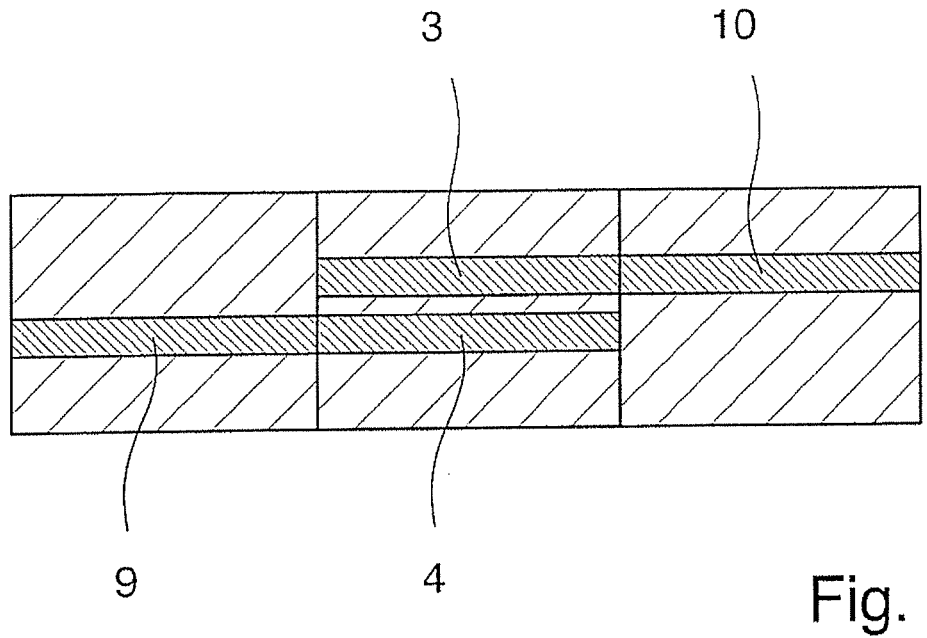
FIG. 6 is a schematic representation of the transitions between the feed fiber, the first and the second fiber-optic means and the evaluation fiber of a deflection measuring device according to the invention.
Figure 7:
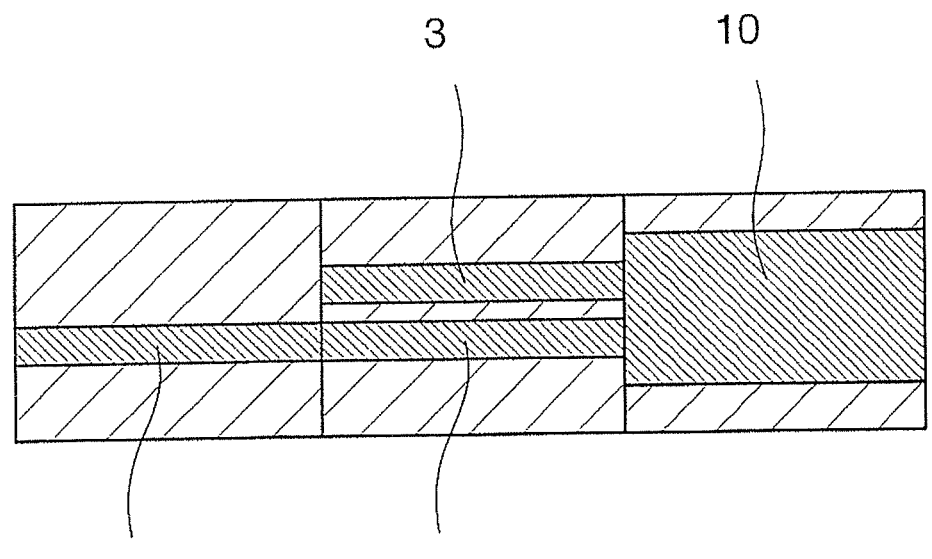
FIG. 7 is a schematic representation of the transitions between the feed fiber, the first and the second fiber-optic means and the evaluation fiber of a deflection measuring device according to the invention.

The embodiments according to FIGS. 5, 6 and 7 have in common that the light-guiding cross section of the optical feed fiber 9 at the input side junction at least partially covers only the light-guiding cross section of the first fiber-optic means 3 or the light-guiding cross section of the second fiber-optic means 4. The embodiments according to FIGS. 5 and 6 additionally have in common that the light-guiding cross section of the evaluation optical fiber 10 at the output side junction at least partially covers only the light-guiding cross section of the first fiber-optic means 3.

The connection diagram implemented by the embodiment according to FIG. 5 provides that the optical feed fiber 9 couples radiation into only one fiber-optic means of the first fiber-optic means 3 and the second fiber-optic means 4—presently namely only into the first fiber-optic means 3—and the evaluation fiber 10 decouples radiation out of only the same fiber-optic means 3, into which the feed fiber 9 has coupled radiation into. Due to the effect of crosstalk in the second fiber-optic means 4, this second fiber-optic means 4 also guides partial radiation, wherein this partial radiation finally is coupled back into the first fiber-optic means so that the interference radiation transmitted via the evaluation fiber 10 can be evaluated by the evaluation circuit (not shown in detail).

In the embodiment according to FIG. 6, a different method is used. Here, the optical feed fiber 9 also couples radiation into—as in the embodiment according to FIG. 5—only one fiber-optic means of the first fiber-optic means 3 and the second fiber-optic means 4—presently, namely, into the second fiber-optic means 4—however, the evaluation fiber 10 decouples only the partial radiation out of the one fiber-optic means of the first fiber-optic means 3 and the second fiber-optic means 4, in which the feed fiber 9 does not couple radiation directly into, i.e., the evaluation fiber 10 is joined here to the first fiber-optic means 3. In this embodiment, the possibility of crosstalk between the first fiber-optic means 3 and the second fiber-optic means 4 is also a necessary requirement for the functionality of the deflection measuring device.

In the embodiment according to FIG. 7, the optical feed fiber 9 also couples radiation into only one single fiber-optic means of the first fiber-optic means 3 and the second fiber-optic means 4—presently, namely, into the second fiber-optic means 4—the evaluation fiber 10, however, decouples the partial radiations of the first fiber-optic means 3 and the second fiber-optic means at the output side, wherein the evaluation fiber 10 is a multi-mode fiber in the shown case.

What is claimed is:

1. Deflection measuring device according to the interferometer principle, comprising:
    a radiation source,
    a first fiber-optic means for forming a first light path,
    a second fiber-optic means for forming a second light path,
    a deflection body and
    an evaluation circuit,
    wherein the first fiber-optic means and the second fiber-optic means are parts of a multi-core optical fiber,
    wherein said deflection body comprises a membrane;
    wherein the first fiber-optic means and the second fiber-optic means are positioned to be impinged with interference-capable radiation from the radiation source on an input side,
    wherein at least the first fiber-optic means is connected to the deflection body,
    wherein the multi-core fiber has a flattening that is positioned against the deflection body with the flattening having a fixed orientation relative to cores of the multi-core fiber, the cores being arranged one above the other perpendicular to the flattening causing said first fiber-optic means and said second fiber-optic means to experience different deflections due to deflection of said deflection body,
    wherein a first partial radiation beam guided in the first fiber-optic means and a second partial radiation beam guided in the second fiber-optic means are connected on an output side in a manner causing interference radiation to be conveyed to the evaluation circuit and evaluated by the evaluation circuit,
    wherein the first fiber-optic means and the second fiber-optic means are arranged only on the deflection body,
    wherein the first fiber-optic means and the second fiber-optic means are directly connected on the input side to the radiation source with a single feed optical fiber,
    wherein the single feed optical fiber has a light-guiding cross section that is large enough at an input-side junction to at least partially cover simultaneously both the light-guiding cross section of the first fiber-optic means and the light-guiding cross section of the second fiber-optic means,
    wherein said single feed optical fiber couples radiation into the first fiber-optic means and the second fiber-optic means,
    wherein said evaluation optical fiber has a light-guiding cross section that is large enough at an output-side junction to at least partially cover simultaneously both the light-guiding cross section of the first fiber-optic means and the light-guiding cross section of the second fiber-optic means,
    wherein said evaluation optical fiber decouples radiation out of the first fiber-optic means and the second fiber-optic means,
    wherein the first fiber-optic means and the second fiber-optic means are directly connected on the output side to the evaluation circuit with a single evaluation optical fiber,
    wherein the first fiber-optic means and the second fiber-optic means are positioned close enough to one another to enable crosstalk of the partial radiation beam guided along each of the fiber-optic means to the other of fiber-optic means,
    wherein the crosstalk between the first fiber-optic means and the second fiber-optic means is obtained by means of guided evanescent parts of the partial radiation guided outside of at least one of the first fiber-optic means and the second fiber-optic means,
    wherein the feed optical fiber and the evaluation optical fiber are formed each of a single-core optical fiber, and
    wherein the distance between said first fiber-optic means and said second fiber-optic means is less than 10 wavelengths of the guided partial radiation.

2. Deflection measuring device according claim 1, wherein the distance between the first fiber-optic means and the second fiber-optic means is less than 5 wavelengths of the guided partial radiation.

* * * * *